United States Patent
Hutter, III et al.

(10) Patent No.: US 8,616,868 B2
(45) Date of Patent: *Dec. 31, 2013

(54) SEALANT MOLD FIXTURE FOR A DOMED CAP

(75) Inventors: Charles G. Hutter, III, Carson City, NV (US); John M. Cortez, Palmdale, CA (US)

(73) Assignee: Physical Systems, Inc., Carson City, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/406,453

(22) Filed: Feb. 27, 2012

(65) Prior Publication Data

US 2012/0217673 A1 Aug. 30, 2012

Related U.S. Application Data

(60) Provisional application No. 61/447,557, filed on Feb. 28, 2011.

(51) Int. Cl.
*B29C 33/40* (2006.01)

(52) U.S. Cl.
USPC .......... 425/117; 248/205.3; 156/578; 156/91; 411/907; 425/14; 425/127

(58) Field of Classification Search
USPC .......................................... 264/219; 425/175
See application file for complete search history.

(56) References Cited

U.S. PATENT DOCUMENTS

| | | | |
|---|---|---|---|
| 4,822,656 A * | 4/1989 | Hutter, III | 428/41.8 |
| 5,013,791 A | 5/1991 | Kerr et al. | |
| 5,304,747 A | 4/1994 | Hale, II | |
| 5,593,120 A * | 1/1997 | Hamerski | 248/205.3 |
| 7,575,208 B2 * | 8/2009 | Lan | 248/205.3 |
| 7,900,655 B2 * | 3/2011 | Morton et al. | 138/99 |
| 8,292,253 B2 * | 10/2012 | Zhadanov | 248/683 |
| 2002/0162537 A1* | 11/2002 | Smith et al. | 123/446 |
| 2003/0131826 A1* | 7/2003 | Smith et al. | 123/446 |
| 2004/0232573 A1* | 11/2004 | Nakamura et al. | 264/1.32 |
| 2009/0057510 A1* | 3/2009 | Orban | 248/205.4 |

* cited by examiner

*Primary Examiner* — Joseph S Del Sole
*Assistant Examiner* — Nahida Sultana
(74) *Attorney, Agent, or Firm* — Lowry Blixseth LLP; Stuart O. Lowry; Scott M. Lowry

(57) ABSTRACT

A sealant mold for sealing a domed nutplate unit particularly at a lower region about an adhesively attached interface with a substrate such as an aircraft fuel tank wall. The sealant mold is formed from a lightweight plastic material, and includes an inner cap in combination with an outer skirt to define a gap or trough for receiving and supporting a metered quantity of a curable sealant material. The mold is fitted onto a dome of the nutplate unit with an inner cap inboard edge landed onto a dome shoulder. The outer skirt is then displaced downwardly about the landed inner cap to extrude the sealant material about the lower region of the nutplate unit particularly such as the adhesively attached interface with the substrate. The sealant material is allowed to cure, after which the sealant mold can be stripped quickly and easily from the cured sealant material.

14 Claims, 8 Drawing Sheets

SEALANT MOLD FIXTURE FOR A DOMED CAP

BACKGROUND OF THE INVENTION

This invention relates generally to a sealant mold for use with a domed nutplate unit or the like for sealing a lower portion of the nutplate unit particularly such as an adhesively mounted interface with a substrate against exposure to undesirable fluids and the like. More particularly, this invention relates to an improved sealant mold and related method of use wherein the lower portion of a domed nutplate unit or the like is effectively sealed with a minimum weight addition.

Domed nutplate units and the like are generally known in the art, wherein a nutplate or other selected fastener device is encased within a dome or dome element to prevent contact with fluids present on one side of the dome. The fastener device is typically mounted onto a selected substrate, such as the wall of an aircraft fuel tank or the like, wherein the dome further is intended to prevent leakage of fluid such as aircraft fuel through a substrate bolt hole or the like aligned with the nutplate. In the past, such domed nutplate units have been mounted onto the substrate by means of rivets. More recently, as described in U.S. Pat. Nos. 5,013,791 and 5,304,747 (which are incorporated by reference herein), adhesive mounting techniques for mounting the domed nutplate onto the substrate have been developed.

In an aircraft fuel tank environment, it can be highly desirable to seal the attachment interface between a domed nutplate unit and a substrate. In a rivet-mounted nutplate unit, such sealing can be critical in preventing undesirable fuel leakage to the exterior of a fuel tank. In an adhesively mounted nutplate unit, sealing can be important to prevent undesirable degradation of the attachment material. In either case, it is highly desirable to provide a sealant material in a sufficient thickness and to apply this sealant material with great care to preclude any pinholes or voids that might otherwise allow fuel and/or water within the aircraft fuel tank to leak past the sealant and cause rivet corrosion and/or attack the adhesive material. However, in a modern aircraft environment, it is also important to note that additional weight added to the aircraft for use in sealing the attachment interface can be undesirable for its negative impact on overall fuel efficiency.

In the past, various mold devices have been proposed and used for applying sealant material over a domed nutplate unit or the like, wherein this sealant material cures to a relatively tough and rubbery state that is substantially impervious to attack or contamination due to contact with fuel and/or water within the aircraft fuel tank. However, the existing mold devices generally apply an excess amount of sealant material to cover substantially the entire nutplate unit within the fuel tank, and these mold devices are not adapted for convenient removal following curing of the sealant material. Accordingly, the excess amount of sealant material in combination with the non-removable mold devices contributes to undesired weight addition to the aircraft.

The present invention overcomes these problems and disadvantages by provided an improved sealant mold designed to apply a curable sealant material only to a portion of a domed nutplate unit or the like at a location surrounding the attachment interface thereof with a substrate such as a wall of an aircraft fuel tank or the like, and further wherein the improved sealant mold is removable quickly and easily following curing of the sealant material.

SUMMARY OF THE INVENTION

In accordance with the invention, a sealant mold is provided for sealing a domed nutplate unit or the like particularly at a lower region thereof about an interface between the nutplate unit and a substrate such as a wall of an aircraft fuel tank or the like. The sealant mold is formed from a lightweight plastic material, and includes an inner cap in combination with an outer skirt to define a gap or trough for receiving and supporting a metered quantity of a curable sealant material. The mold is fitted onto a protective dome of the nutplate unit or the like with an inboard edge of the inner cap landed onto a dome shoulder. The outer skirt is then displaced downwardly about the landed inner cap in a direction toward the substrate to extrude the sealant material about the lower region of the nutplate unit particularly such as the attachment interface thereof with the substrate. The sealant material is allowed to cure, after which the sealant mold including the inner cap and the outer skirt can be stripped quickly and easily from the cured sealant material.

In a preferred form, the domed nutplate unit is designed for adhesive attachment to the substrate, with a bead of cured adhesive material surrounding or circumscribing a bolt passage or the like in the substrate to receive a threaded bolt or the like for secure affixation to the nutplate unit. In an alternative preferred form, the domed nutplate unit is designed for alternative securement to the substrate, as by means of one or more rivets. In either case, the dome of the nutplate unit overlies and protects against intrusion of corrosive fluids, such as aircraft fuel and/or water when the nutplate unit is mounted onto the wall of an aircraft fuel tank.

In one preferred form of the invention, the sealant mold carries the curable sealant material within an annular chamber formed therein. A lower end of this annular chamber is defined by an array or plurality of passages through which the sealant material can be delivered as by means of an annular plunger or the like at an upper end of the annular chamber.

The sealant mold of the present invention applies the curable sealant material only about the interface attachment region of the nutplate unit with the substrate. That is, the sealant mold applies the curable sealant material to extend in substantially sealed relation between the substrate and the dome, in a position overlying and/or circumscribing the attachment interface region. Accordingly, a relative minimum amount of the curable sealant material is used, thereby minimizing aircraft weight gain attributable to the sealant material. In addition, the sealant mold including the inner cap and the outer skirt is formed from a plastic material suitable for easy strip-off removal from the cured sealant material to further minimize overall aircraft weight gain. Importantly, the cured sealant material effectively prevents fluid attack and resultant failure of an adhesively mounted attachment interface. Alternatively, the cured sealant material effectively prevents fluid attack and resultant failure of rivets or the like used to attach the domed nutplate unit.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
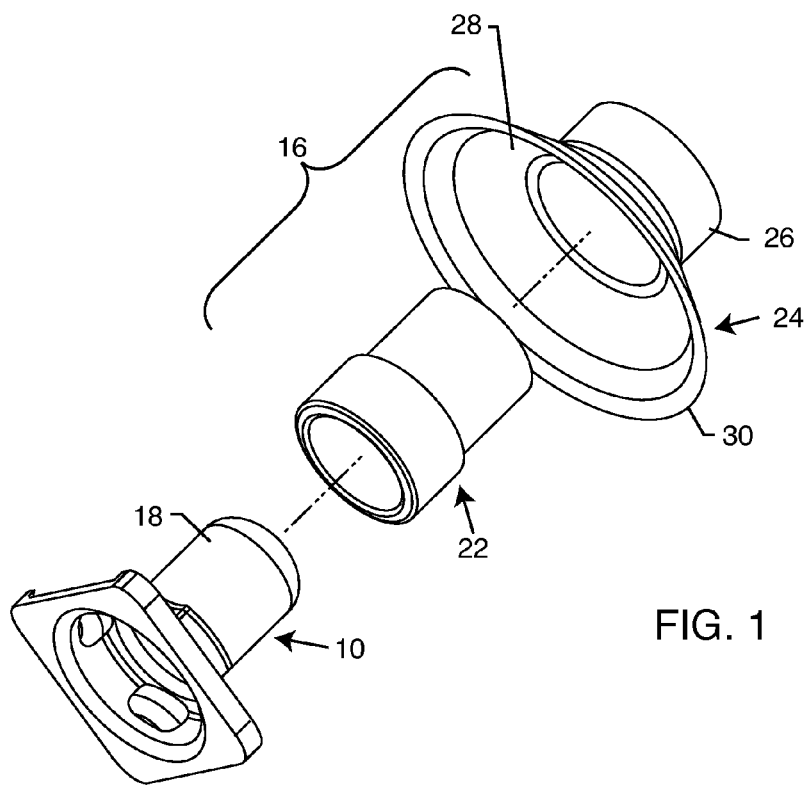
FIG. 1 is an exploded perspective view of a sealant mold including an inner cap and an outer skirt shown in exploded relation with an adhesive mounted domed nutplate unit.

As shown in the exemplary drawings, a domed nutplate unit 10 or the like (FIGS. 1, 4 and 6-7) mounted onto a selected substrate 12 (FIGS. 4-7) is effectively and relatively quickly sealed by means of a curable sealant material 14 (FIGS. 2-7) applied by a sealant mold 16 (FIGS. 1-7) of the present invention. The sealant material 14, when cured, is applied in a limited amount and a controlled but substantially minimum and uniform thickness layer for securely coating and covering an attachment interface between the domed nutplate unit 10 or the like and the substrate 12. That is, the cured sealant material effectively seals between the substrate 12 and a dome 18 (FIGS. 4, 6 and 7) of the nutplate unit 10 or the like to safeguard the sealed attachment interface against degradation or fluid leakage. After the sealant material is substantially completely cured, the sealant mold 16 of the present invention is stripped quickly and easily from the cured sealant material 14 (FIG. 7), whereby the attachment interface is effectively sealed and protected with a minimum of overall sealant usage and resultant weight gain.

The domed nutplate unit 10 or the like is typically installed at a so-called blind side of the substrate 12 to position a threaded nut (not shown) or the like in a position generally aligned with a bolt hole or the like to receive a threaded shaft (also not shown) passed through the bolt hole into threaded engagement with the nutplate. In a hostile environment, such as when the substrate 12 comprises a wall of an aircraft fuel tank or the like, the dome 18 of the nutplate unit 10 is shown with a generally cylindrical profile shape and is designed to overlie and protect the internal nutplate against undesired contact with a corrosive or similar fluid, such as fuel and/or water within an aircraft fuel tank. The domed nutplate unit 10 can be conventionally mounted within the fuel tank onto the substrate 12 by means of small rivets or the like, or alternately and more preferably, the domed nutplate unit 10 can be mounted onto the fuel tank wall by means of a curable adhesive material or bead 20 (FIGS. 4 and 6) as shown and described in U.S. Pat. Nos. 5,013,391 and 5,304,747, which are incorporated by reference herein.

The sealant mold 16 and related installation method of the present invention effectively coats or seals a blind side of the attachment interface between the domed nutplate unit 10 or the like and the substrate 12 to prevent undesired leakage of fuel or the like past this attachment interface, and also to prevent undesired degradation or attack by the corrosive fuel and/or water within the fuel tank of the cured adhesive material or bead 20 used for affixing the domed nutplate unit 10 onto the substrate 12.

One preferred sealant material comprises a polysulfide sealant. An exemplary sealant material is available from PPG Aerospace, division of PPG Industries, Pittsburgh, Pa., under product designation PR 1440. An alternative exemplary sealant material is available from the same company under product designation PR 1422.

Figure 2:
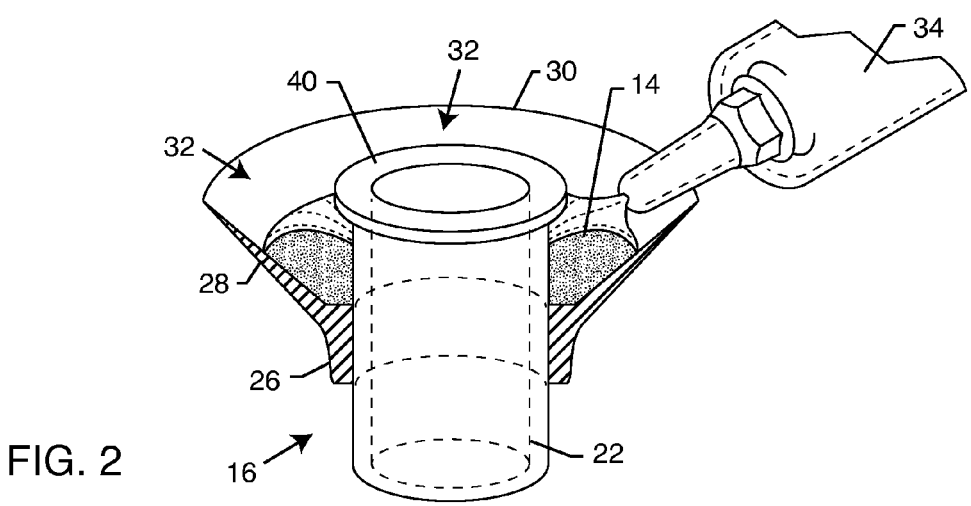
FIG. 2 is a fragmented perspective view showing the inner cap and outer skirt of the sealant mold in inverted relation, in combination with partial filling of an underside gap with a metered quantity of a curable sealant material.

FIG. 1 shows an exemplary domed nutplate unit 10 in exploded relation with one preferred embodiment of the sealant mold 16 of the present invention. As shown, the illustrative sealant mold 16 comprises a generally cylindrical inner cap 22 assembled with an outer skirt 24. The outer skirt includes a generally cylindrical upper segment 26 sized for relatively close slide-fit displacement along an upper region of the cylindrical inner cap 22. From this upper segment 26, the outer skirt 24 includes an outwardly flared lower segment 28 terminating in a comparatively larger annular outer or lower rim 30. FIG. 2 shows these assembled components in an inverted orientation to define a downwardly presented annular trough or gap 32 which is partially filled with a metered quantity of the sealant material 14 in uncured form from a suitable dispenser 34 or the like. Importantly, the quantity of sealant material 14 applied into this trough or gap 32 avoids filling the trough or gap 32 completely to the rim 30, so that the sealant material 14 does not contact undesired surfaces.

Figure 3:
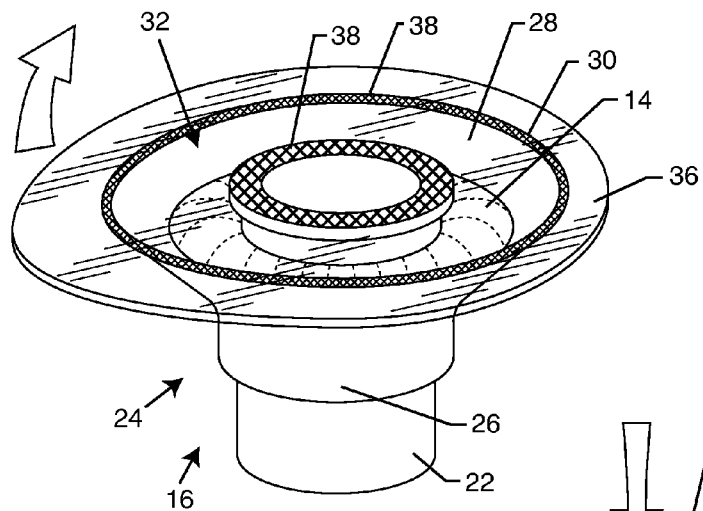
FIG. 3 is an inverted perspective view of the sealant mold partially filled with the curable sealant material, and further depicting a peel-off film covering the underside gap.

FIG. 3 shows a peel-off film 36 of the type disclosed in U.S. Pat. No. 8,038,823, which is incorporated by reference herein. This peel-off film 36 is shown as a thin transparent layer or film covering the lower end of the assembled components 22, 24 of the sealant mold 16, with the metered quantity of sealant material 14 contained within the annular trough or gap 32 in spaced relation from the protective peel-off film 36. As shown, the film 36 may include a suitable pressure sensitive adhesive layer 38 on one side thereof for temporarily securing the film 36 to the rim 30 of the flared lower portion of the outer skirt 24, and also for securing the film 36 to a lower end of the inner cap 22.

In this configuration as viewed in FIG. 3, the entire sealant mold 16 with the metered quantity of uncured sealant material 14 therein can be refrigerated and preferably frozen to prevent the sealant material 14 from curing prematurely. When the sealant mold 16 with sealant material 14 contained therein is ready for use, the entire assembly can be warmed quickly or slowly to thaw the sealant material 14 to a relatively viscous but flowable state.

Figure 4:
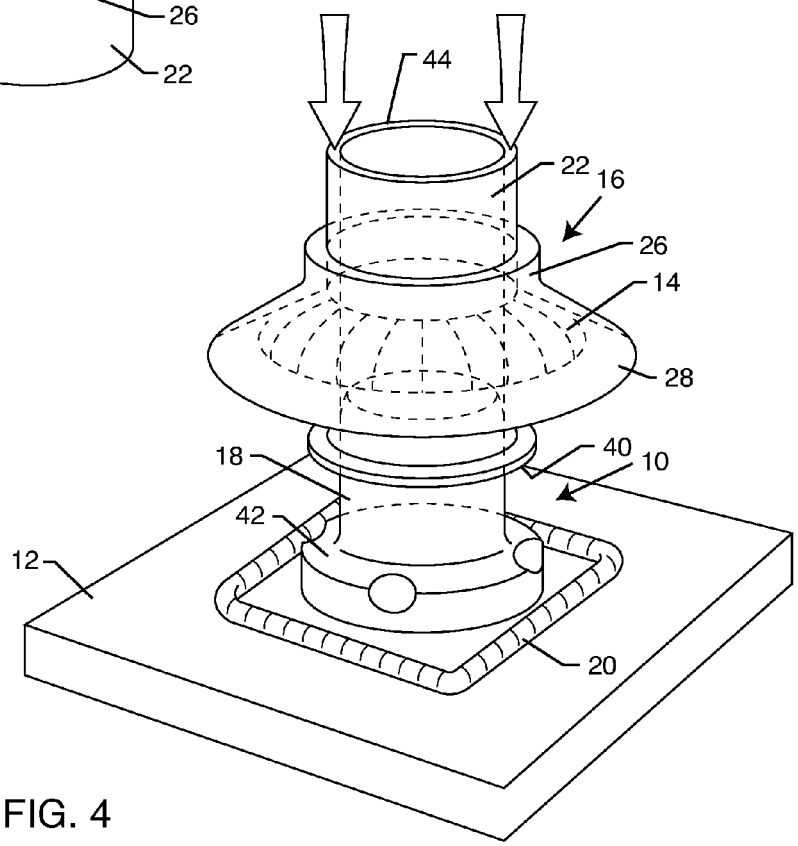
FIG. 4 is a fragmented perspective view showing the domed nutplate unit of FIG. 1 adhesively mounted onto a selected substrate, and further illustrating the sealant mold of the present invention fitted onto a nutplate dome.

FIG. 4 shows application or installation of the sealant mold 16 with the sealant material 14 contained therein over a domed nutplate unit 10 or the like and related dome 18 that has been previously installed onto a substrate 12. The illustrative nutplate unit 10 comprises the adhesively mounted nutplate unit having the substantially cured adhesive material or bead 20 securing the nutplate unit 10 onto the blind side of the substrate 12, wherein this substrate 12 may comprise a wall of an aircraft fuel tank or the like. The peel-off film 36 (FIG. 3) is manually removed from the sealant mold 16 to accommodate installation of the sealant mold onto the domed nutplate unit 10 as viewed in FIG. 4.

Figure 5:
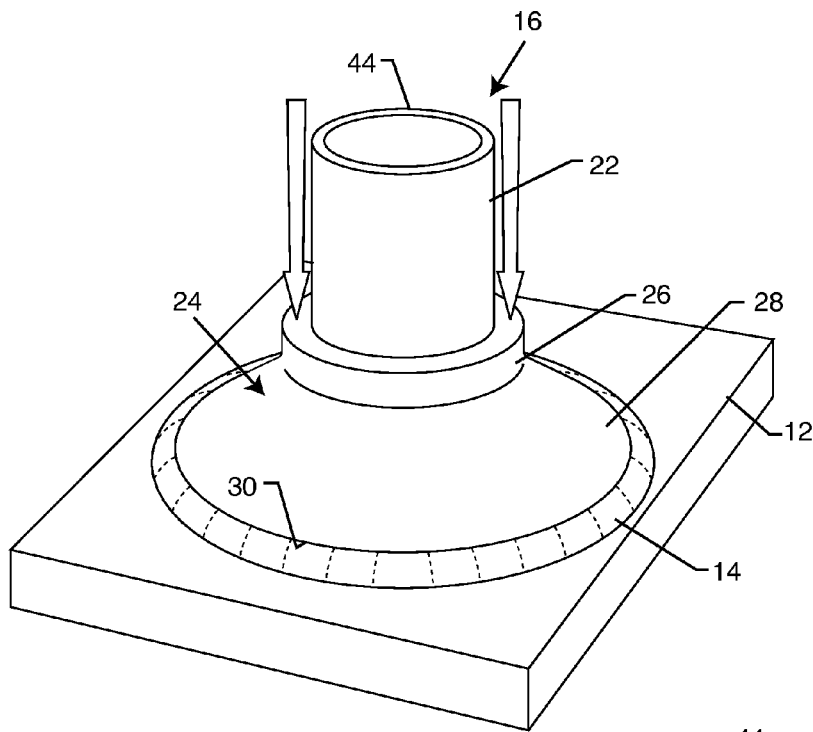
FIG. 5 is a fragmented perspective view similar to FIG. 4, but showing the downward displacement of the outer skirt relative to the inner cap of the sealant mold.
Figure 6:
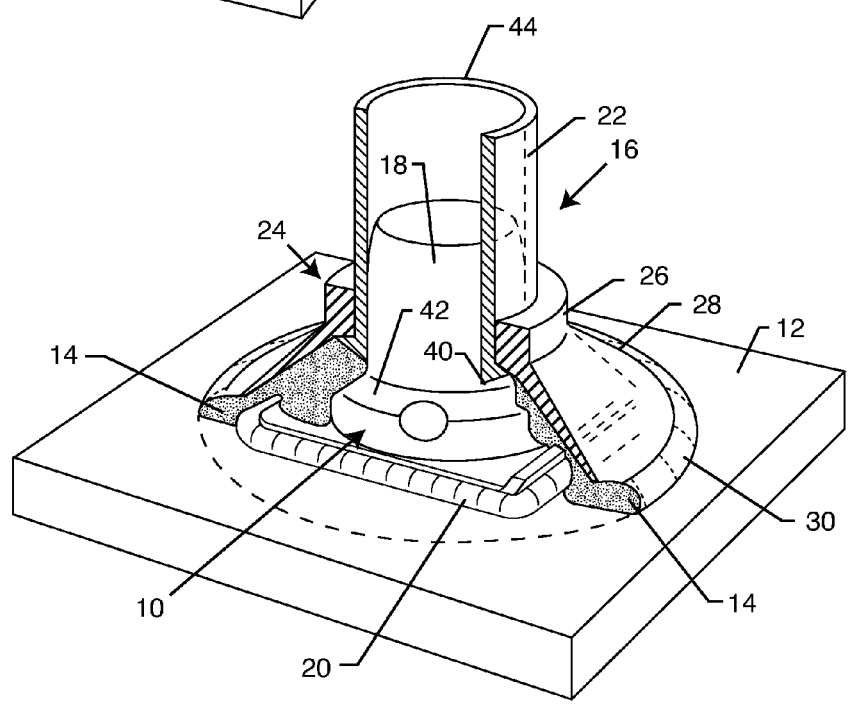
FIG. 6 is a fragmented perspective view similar to FIG. 5, and depicting the sealant mold broken away to illustrate extrusion of the sealant material about a lower region of the nutplate unit.

The inner cap 22 of the sealant mold 16 fits closely but slidably over the dome 18 of the nutplate unit 10, with a lower and radially outwardly flanged end 40 of the cylindrical inner cap 22 landing on and substantially sealing with a radially enlarged lower shoulder 42 on the dome 18 near the adhesive material or bead 20. In this position, with the lower end 40 of the inner cap 22 landed upon the lower shoulder 42 of the dome 18, the outer skirt 24 is then displaced downwardly, in a direction toward the substrate 12, to cause the upper segment 26 to slide along the inner cap 22 to extrude the sealant material 14 downwardly about the attachment interface. More particularly, as the outer skirt 24 is displaced along the inner cap 22, the flared lower end segment 28 of the outer skirt 24 pushes the uncured sealant material 14 downwardly into the shape of an extruded film of substantially uniform thickness surrounding or circumscribing the attachment interface for interconnecting or sealingly intercoupling the dome 18 with the substrate 12 (FIGS. 5-6). In this position, as viewed in FIGS. 5-6, the sealant mold 16 is permitted to remain in place for a period of time of at least about a few hours sufficient to permit the sealant material 14 to cure.

Figure 7:
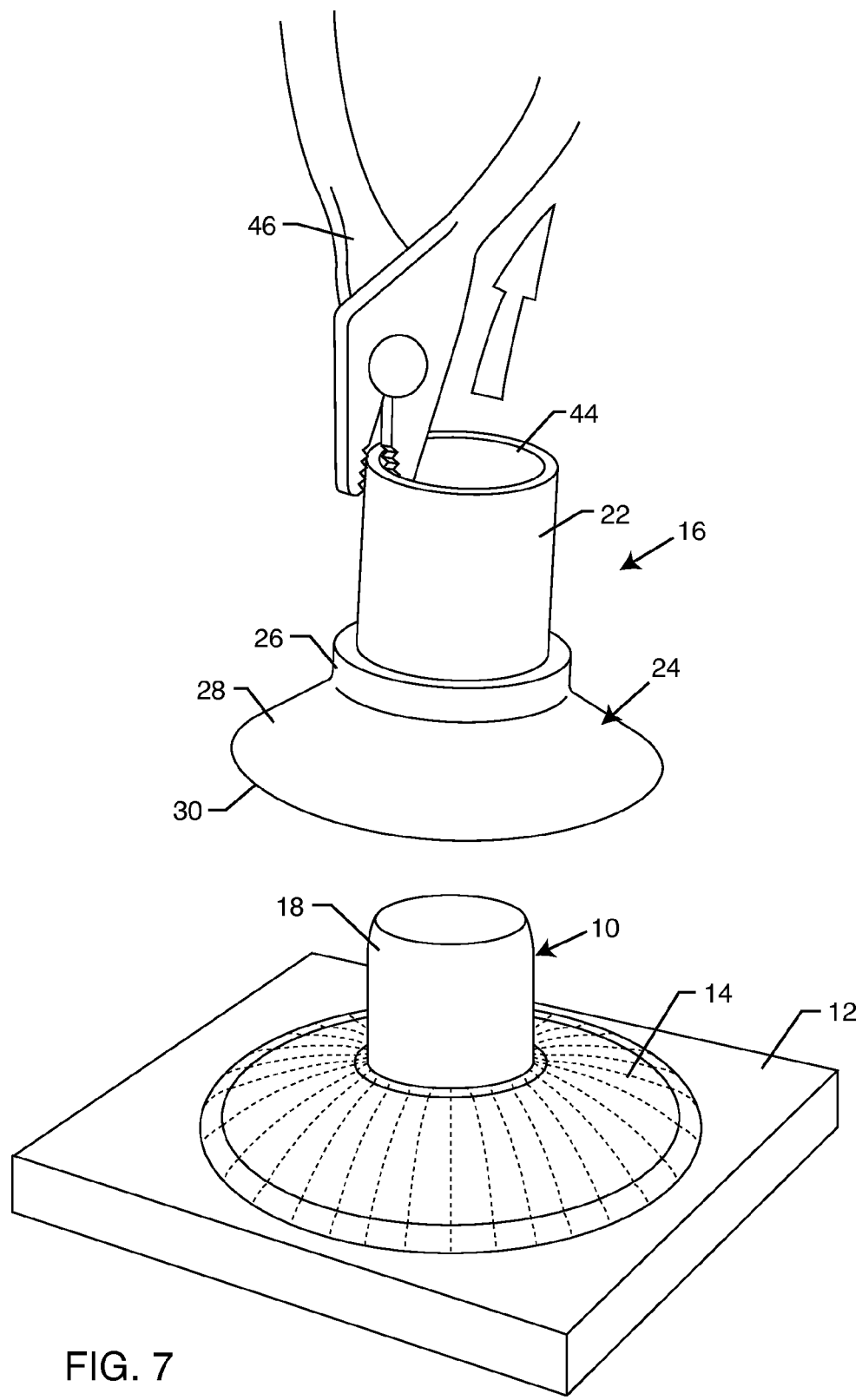
FIG. 7 is a fragmented and exploded perspective view showing removal of the sealant mold from the domed nutplate unit, leaving the cured sealant material about a lower region of the nutplate unit.

Following substantially complete curing of the sealant material 14, the sealant mold 16 is quickly and easily removed from the cured sealant film 14, as shown in FIG. 7. In this regard, the sealant mold 16 is constructed from a plastic or other suitable material that is resistant to permanent adhesive attachment or sticking to the cured sealant film 14. FIG. 7 shows the inner cap 22 having an open upper end 44. A pair of conventional pliers 46 or other suitable tool is used for grasping the open upper end 44 of the inner cap 22 and pulling the sealant mold 16 from the cured sealant 14. Alternately, if desired, the tool 46 can be used to remove the sealant mold 16 with a twist-off motion.

Figure 8:
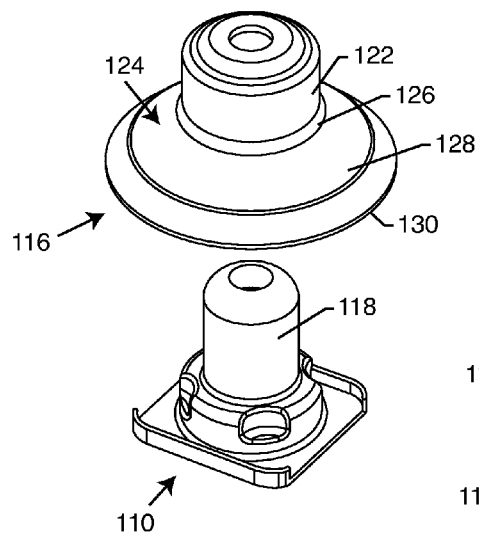
FIG. 8 is a fragmented perspective view depicting an alternative preferred form of the sealant mold in exploded relation with a domed nutplate unit.
Figure 9:
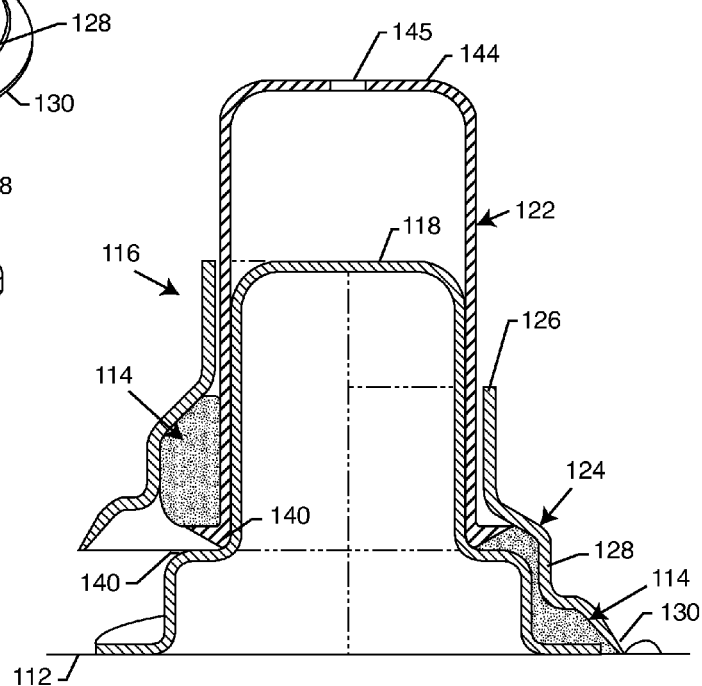
FIG. 9 is a fragmented vertical sectional view of the alternative embodiment of FIG. 8, and showing a left-right split representation of downward displacement of the outer skirt relative to the inner cap of the sealant mold to extrude the sealant material about a lower region of the nutplate unit.
Figure 10:
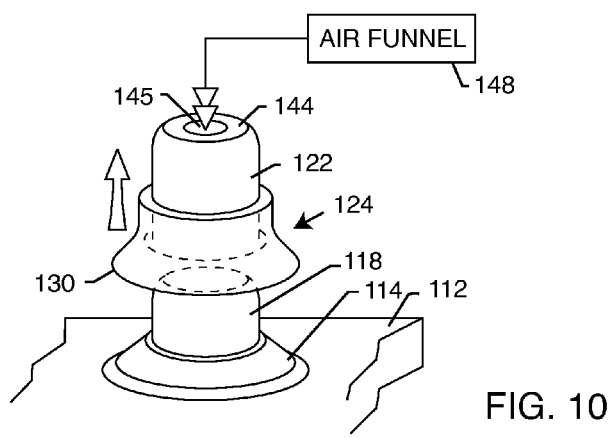
FIG. 10 is a fragmented perspective view similar to FIG. 7 and illustrating pop-off removal of the sealant mold from the domed nutplate unit, leaving the cured sealant material about a lower region of the nutplate unit.

FIGS. 8-10 illustrate one preferred alternative embodiment of the invention, wherein components common with those previously shown and described in FIGS. 1-7 are identified by common reference numerals increased by 100. As shown, a modified sealant mold 116 is provided for applying a curable sealant material 114 about the attachment interface between the dome 118 of a domed nutplate unit 110 or the like secured onto a blind side of a substrate 112, such as the wall of an aircraft fuel tank or the like. As before (FIGS. 1-7), the sealant mold 116 comprises an inner cap 122 having a size and shape for relatively close-fitting sliding relation within an upper cylindrical region 126 of an outer skirt 124, a lower end of which includes an outwardly and downwardly angled flared segment 128 terminating in an outer rim 130.

The assembled components of the sealant mold 116 are pre-filled with a metered quantity of the selected sealant material 114 in the same manner are previously shown and described with respect to FIG. 2. The sealant mold 116 with the metered quantity of the curable sealant material 114 is then fitted onto the dome 118 of the nutplate unit 110 (FIG. 9), with the inner cap 122 having a size and shape for relatively close slide-fit reception over the dome 118. A lower end 140 of the inner cap 122 is landed upon a radially enlarged shoulder 142 at the lower end of the dome 118. The outer skirt 124 is then displaced downwardly in a direction toward the substrate 112 to extrude the sealant material 114 into a relatively thin and substantially uniform layer for securely interconnecting the dome 118 with the substrate 112, all in the manner previously shown and described herein.

The difference between the alternative embodiment of FIGS. 8-10 versus the embodiment of FIGS. 1-7 relates primarily to a reshaped upper end 144 of the inner cap 122. More particularly, instead of the fully open cylindrical shape depicted in FIGS. 1-7, the embodiment of FIGS. 8-10 shows a partially closed upper end 144 with a small port 145 formed therein. With this configuration, after a suitable cure time for the sealant material 114, the entire sealant mold 116 is removed quickly and easily from the cured sealant material as by coupling the upper port 145 to a suitable source 148 of pressurized air or the like. By constructing the sealant mold components from a suitable plastic or plastic-based material that does not permanently adhere to the cured sealant material 114, such brief application of pressurized air or other selected compressed gas through the port 145 and into the upper region of the inner cap 122 is effective to release the entire sealant mold 116 from the cured sealant material 114, as viewed in FIG. 10.

Figure 11:
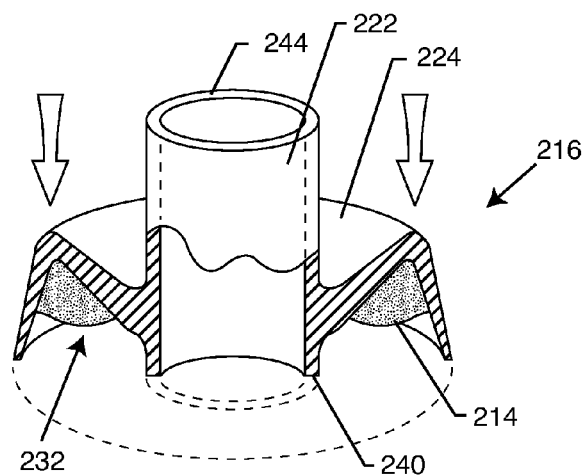
FIG. 11 is a fragmented perspective view showing a further alternative preferred embodiment of the invention.
Figure 12:
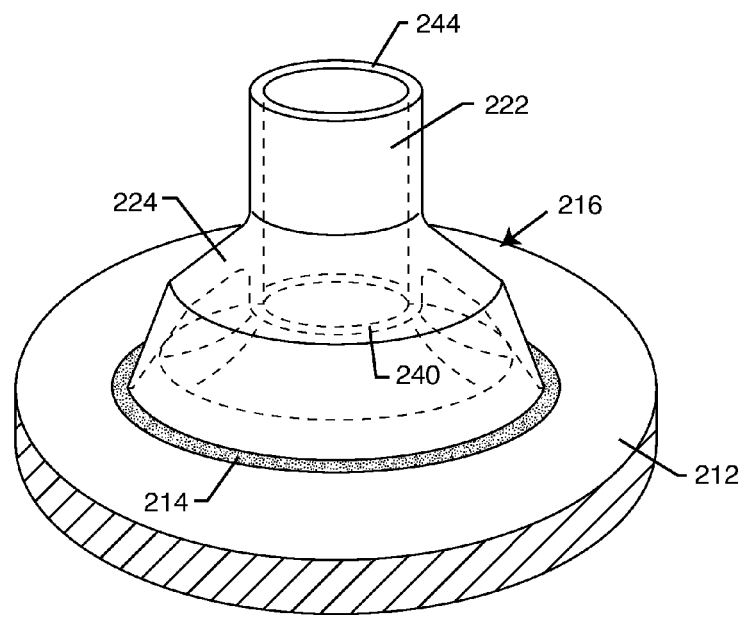
FIG. 12 is a fragmented perspective view showing the alternative embodiment of FIG. 11 with an outer skirt thereof displaced downwardly for extruding the sealant material about a lower region of a domed nutplate unit.

A further alternative preferred embodiment of the invention is shown in FIGS. 11-12, wherein components corresponding in structure and function with those previously shown and described in FIGS. 1-7 are identified by common reference numerals increased by 200. As shown, the sealant mold 216 is constructed with a one-piece or unitary construction to include the inner cap 222 in combination with an outwardly flared lower skirt 224. The inner cap 222 defines a lower end 240 for seating upon a radially enlarged shoulder (not shown) at the lower end of domed nutplate unit (also not shown). The cylindrical interior of the inner cap 222 is sized and shaped for relatively close slide-fit reception over the dome (not shown) of a domed nutplate unit. An upper end 244 of the inner cap 222 is shown to be fully open (consistent with FIGS. 1-7), although persons skilled in the art will recognize and appreciate that the upper end 244 can be partially closed and include a small port formed therein per FIGS. 8-10, if desired.

The outer skirt 224 of the modified sealant mold 216 includes the outwardly flared lower region 228 extending outwardly from the inner cap 222. In an initial position or state, the outwardly flared lower region initially defines the annular trough or gap 232 for receiving a metered quantity of the selected sealant material 214 (FIG. 11). In use, however, the inner cap 222 of the sealant mold 216 is initially fitted onto a domed nutplate unit mounted previously onto a selected substrate 212 (FIG. 12). The lower end 240 of the inner cap 222 is seated upon the dome shoulder (as previously shown and described), followed in turn by displacement of the outer skirt flared lower region 228 downwardly or toward the adjacent substrate 212 (FIG. 12). Such downward displacement of the flared lower region 228 from an initial retracted position defining the annular trough or gap 232 (FIG. 11) over center to an advanced position with an outer rim 230 thereof contacting the substrate 212 (FIG. 12) effectively extrudes the sealant material 214 into a relatively thin layer sealingly interconnecting the dome of the nutplate unit with the substrate 212. After a suitable cure time, the sealant mold 216 is quickly and easily removed, as previously described, from the cured sealant material.

Figure 13:
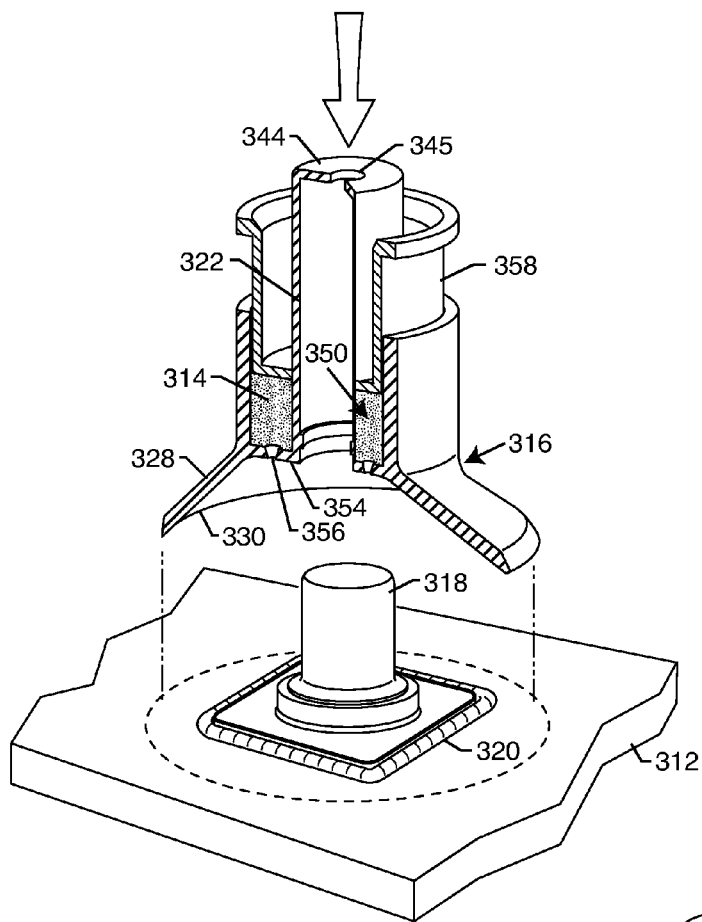
FIG. 13 is a fragmented perspective view showing another alternative preferred embodiment of the invention.
Figure 14:
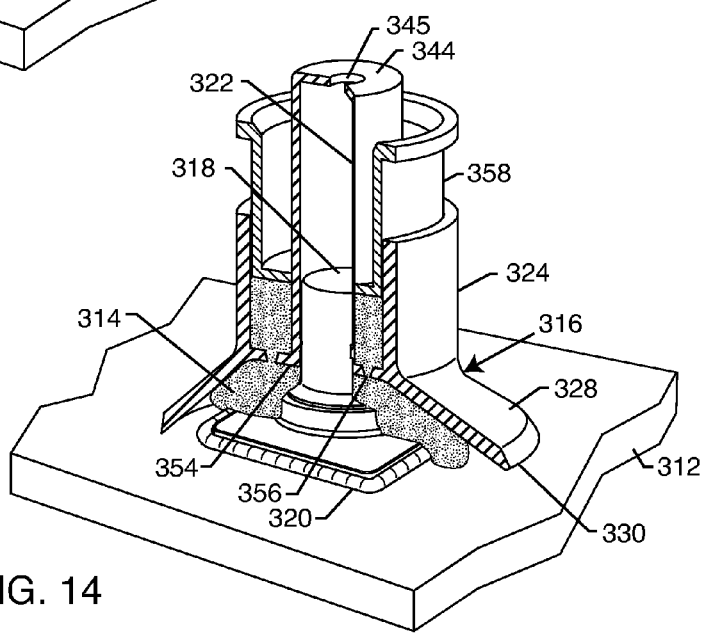
FIG. 14 is a fragmented perspective view similar to FIG. 13, but showing partial mounting of the sealant mold onto a domed nutplate unit.
Figure 15:
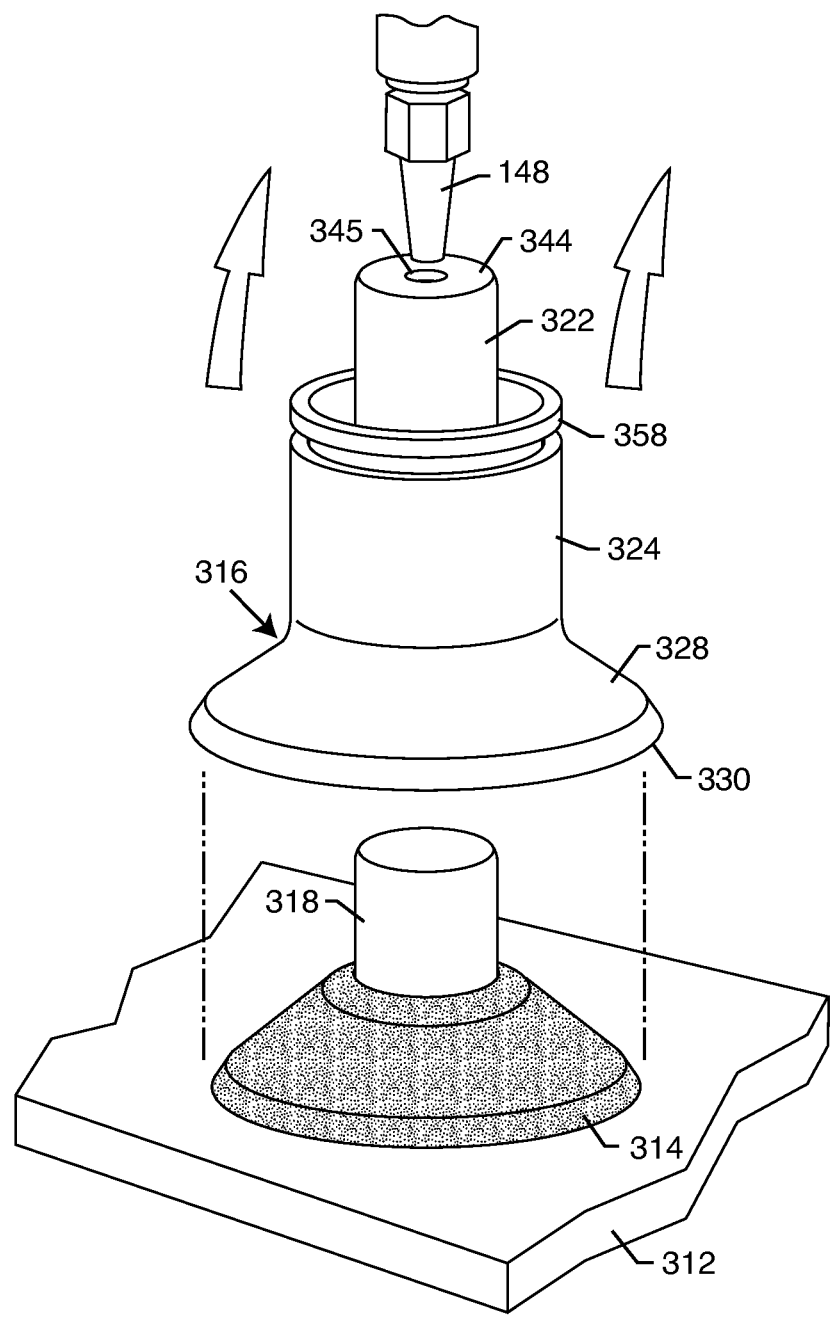
FIG. 15 is a further fragmented perspective view illustrating lift-off separation of the sealant mold from an underlying domed nutplate unit or the like and related cured sealant material.

FIGS. 13-15 show still another alternative preferred form of the invention, wherein components corresponding in structure and function with those previously shown and described in FIGS. 1-7 are identified by common reference numerals increased by 300. As shown, a modified sealant mold 316 is provided for applying a curable sealant material 314 about the attachment interface between a dome 318 of a domed nutplate unit 310 or the like secured onto a blind side of a substrate 312, such as the wall of an aircraft fuel tank or the like. As before (FIGS. 1-7), the sealant mold 316 comprises an inner cap 322 defining an inboard wall of an upper and generally cylindrical chamber 350, the outer wall of which is defined by a generally cylindrical outer skirt 324. A lower end of the outer skirt 324 blends smoothly with an outwardly and downwardly angled flared segment 328 terminating in an outer rim 330.

The inner cap 322 of the sealant mold 316 defines an internal wall or boundary of the generally cylindrical cavity or chamber 350 defined by the sealant mold 316. The outer wall or boundary of this chamber 350 is defined by an upstanding outer skirt 324 on the sealant mold 316, and a lower wall or boundary is defined by a short annular wall 354 which interconnects the inner cap 322 with the outer skirt 324 and has an array or plurality of small passages 356 formed therein. This otherwise open-topped chamber 350 is prefilled with a metered quantity of the selected curable sealant material 314, followed by closing of the upper region of the chamber 350 with an annular-shaped plunger 358 or the like which fits slidably with relatively close tolerance therein.

The assembled components of the sealant mold 316 are then positioned over the dome 318 of a nutplate unit 310 or the like, as viewed in FIG. 13. In this initial position, the sealant material 314 is disposed entirely within the sealant mold chamber 350. The sealant mold 316 is then pressed downwardly over the underlying dome 318 until the outer rim 330 of the downwardly angled flared segment 328 seats substantially upon the blind side of the substrate 312 in circumscribing relation with the attachment interface or bead 320 of the nutplate unit 310 or the like. In this position, the plunger 358 is slidably depressed in a direction toward the substrate 312 to extrude the sealant material 314 from the chamber 350 and through the array of passages 356 into a relatively thin and substantially uniform layer for securely interconnecting the dome 318 with the substrate 312, all in the manner previously shown and described herein.

Following curing of the sealant material 314, a reshaped upper end 344 of the inner cap 322 facilitates quick and easy removal of the sealant mold 316. More particularly, the embodiment of FIGS. 13-15 again shows a partially closed upper end 344 with a small port 345 formed therein. With this configuration, after a suitable cure time for the sealant material 314, the entire sealant mold 316 is removed quickly and easily from the cured sealant material as by coupling the upper port 345 to a suitable source 148 of pressurized air or other selected compressed gas or the like. By constructing the sealant mold components from a suitable plastic or plastic-based material that does not permanently adhere to the cured sealant material 314, such brief application of pressurized air through the port 345 and into the upper region of the inner cap 322 is effective to release the entire sealant mold 316 from the cured sealant material 314, as viewed in FIG. 15.

A variety of further modifications and improvements in and to the improved sealant mold and related method or use will be apparent to those persons skilled in the art. Accordingly, no limitation on the invention is intended by way of the foregoing description and accompanying drawings.

What is claimed is:

1. A sealant mold fixture for sealing an attachment interface between a substrate and an element mounted onto the substrate, said sealant mold fixture comprising:
   a sealant mold having an outer skirt joined at a lower end thereof to a downwardly angled flared segment terminating in an outer rim having a size and shape to circumscribe the attachment interface;
   said sealant mold further including an inner cap carried by said outer skirt, said inner cap having a size and shape to accommodate slide-fit reception of the element; and
   a metered quantity of a curable sealant material in uncured form partially filling the space between said inner cap and said outer skirt;
   said sealant mold outer rim being substantially landable on the substrate in a position circumscribing the attachment interface whereby the sealant material is applied to seal between the substrate and the element.

2. The sealant mold fixture of claim 1 wherein said sealant mold is formed from a plastic-based material to avoid permanent adherence to the cured sealant material.

3. The sealant mold fixture of claim 1 wherein said sealant mold outer skirt is slidably movable relative to said inner cap in a direction toward the substrate after said sealant mold outer rim is landed thereon for delivering the sealant material to seal between the substrate and the element.

4. The sealant mold fixture of claim 1 wherein said inner cap cooperates with said outer skirt to define a chamber therebetween for receiving said metered quantity of said sealant material, said chamber having a lower end defined by a wall having a plurality of passages formed therein, and a plunger received into an upper end of said chamber after said sealant material in received thereinto, said plunger being movable toward the substrate after said sealant mold outer rim is landed thereon for delivering the sealant material to seal between the substrate and the element.

5. The sealant mold fixture of claim 1 wherein said sealant mold is lift-off separated from said sealant material after curing thereof.

6. The sealant mold fixture of claim 5 wherein said sealant mold inner cap has a relatively small open port formed therein, and further including compressed gas means selectively coupled with said port for lift-off separation of said sealant mold from said sealant material after curing thereof.

7. A sealant mold fixture for sealing an attachment interface between a substrate and a domed cap, said sealant mold fixture comprising:
   a sealant mold having an outer skirt joined at a lower end thereof to a downwardly angled flared segment terminating in an outer rim having a size and shape to circumscribe the attachment interface;
   said sealant mold further including an inner cap carried by said outer skirt, said inner cap having a size and shape to accommodate slide-fit reception of the domed cap; and
   a metered quantity of a curable sealant material in uncured form partially filling the space between said inner cap and said outer skirt;
   said sealant mold outer rim being substantially landable on the substrate in a position circumscribing the attachment interface;
   said sealant mold outer skirt being movable relative to said inner cap after said sealant mold outer rim is landed on the substrate to deliver the sealant material to seal between the substrate and the domed cap;

said sealant mold being separable from said sealant material after curing thereof.

8. A sealant mold fixture for sealing an attachment interface between a substrate and a domed cap, said sealant mold fixture comprising:

a sealant mold having an outer skirt joined at a lower end thereof to a downwardly angled flared segment terminating in an outer rim having a size and shape to circumscribe the attachment interface;

said sealant mold further including an inner cap carried by said outer skirt, said inner cap having a size and shape to accommodate slide-fit reception of the domed cap; and a metered quantity of a curable sealant material in uncured form partially filling the space between said inner cap and said outer skirt;

said sealant mold outer rim being substantially landable on the substrate in a position circumscribing the attachment interface;

said inner cap cooperating with said outer skirt to define a chamber therebetween for receiving said metered quantity of said sealant material, said chamber having a lower end defined by a wall having a plurality of passages formed therein, and a plunger received into an upper end of said chamber after said sealant material in received thereinto, said plunger being movable toward the substrate after said sealant mold outer rim is landed thereon for delivering the sealant material to seal between the substrate and the domed cap;

said sealant mold being separable from said sealant material after curing thereof.

9. A method of sealing between a substrate and a domed cap, said method comprising the steps of:

forming a sealant mold having an outer skirt joined at a lower end thereof to a downwardly angled flared segment terminating in an outer rim having a size and shape to circumscribe the attachment interface, said sealant mold further including an inner cap carried by said outer skirt, said inner cap having a size and shape to accommodate slide-fit reception of the domed cap;

partially filling the space between the sealant mold outer skirt and the sealant mold inner cap with a curable sealant material in uncured form;

landing the sealant mold outer rim on the substrate in a position circumscribing the attachment interface whereby the sealant material is applied to seal between the substrate and the domed cap;

separating the sealant mold from the sealant material after curing thereof.

10. The method of claim 9 wherein said forming step comprises forming the sealant mold from a plastic-based material to avoid permanent adherence to the cured sealant material.

11. The method of claim 9 wherein said forming step comprises forming the sealant mold outer skirt to be slidably movable relative to the inner cap, and further including the step of slidably moving the sealant mold outer skirt on the inner cap in a direction toward the substrate after the sealant mold outer rim is landed thereon for delivering the sealant material to seal between the substrate and the domed cap.

12. The method of claim 9 wherein said forming step comprises forming the inner cap to cooperate with the outer skirt to define a chamber therebetween for receiving the metered quantity of the sealant material, the chamber having a lower end defined by a wall having a plurality of passages formed therein, and a plunger received into an upper end of the chamber after the sealant material in received thereinto, and further including the step of moving the plunger being toward the substrate after the sealant mold outer rim is landed thereon for delivering the sealant material to seal between the substrate and the domed cap.

13. The method of claim 9 wherein said step of separating the sealant mold from the sealant material after curing thereof comprises lift-off separation.

14. The method of claim 13 wherein said forming step further comprises forming the sealant mold inner cap with a relatively small open port formed therein, and further wherein said separating step comprises coupling compressed gas means to the inner cap port for lift-off separation of the sealant mold from the sealant material after curing thereof.

* * * * *